US009942535B2

(12) United States Patent
Zhou et al.

(10) Patent No.: US 9,942,535 B2
(45) Date of Patent: Apr. 10, 2018

(54) METHOD FOR 3D SCENE STRUCTURE MODELING AND CAMERA REGISTRATION FROM SINGLE IMAGE

(71) Applicant: BEIHANG UNIVERSITY, Beijing (CN)

(72) Inventors: Zhong Zhou, Beijing (CN); Jingdi You, Beijing (CN); Jin Yang, Beijing (CN); Yi Zhou, Beijing (CN); Wei Wu, Beijing (CN)

(73) Assignee: BEIHANG UNIVERSITY, Beijing (CN)

( * ) Notice: Subject to any disclaimer, the term of this patent is extended or adjusted under 35 U.S.C. 154(b) by 178 days.

(21) Appl. No.: 15/144,557

(22) Filed: May 2, 2016

(65) Prior Publication Data
US 2016/0249041 A1    Aug. 25, 2016

Related U.S. Application Data

(63) Continuation of application No. PCT/CN2015/095854, filed on Nov. 27, 2015.

(30) Foreign Application Priority Data

Nov. 28, 2014  (CN) .......................... 2014 1 0715176

(51) Int. Cl.
*H04N 13/02* (2006.01)
*G06T 7/60* (2017.01)
(Continued)

(52) U.S. Cl.
CPC ......... *H04N 13/0246* (2013.01); *G06T 7/536* (2017.01); *G06T 7/55* (2017.01);
(Continued)

(58) Field of Classification Search
CPC .......... H04N 13/0246; H04N 13/0239; H04N 13/0014; G01B 11/24; G06T 7/55;
(Continued)

(56) References Cited

U.S. PATENT DOCUMENTS

| 2005/0031195 A1* | 2/2005 | Liu ..................... G06K 9/00275 |
| | | 382/154 |
| 2015/0199573 A1* | 7/2015 | Rane ................. G06F 17/30247 |
| | | 382/168 |

FOREIGN PATENT DOCUMENTS

| CN | 101271591 A | 9/2008 |
| CN | 101697236 A | 4/2010 |

(Continued)

OTHER PUBLICATIONS

Jean-Charles Bazin et al., "3-line RANSAC for Orthogonal Vanishing Point Detection" IEEE/RSJ International Conference on Intelligent Robots and Systems ; (Oct. 2012).
(Continued)

*Primary Examiner* — Allen Wong
(74) *Attorney, Agent, or Firm* — J.C. Patents

(57) ABSTRACT

The present invention discloses a method for modeling and registering 3D scene structure based on single image, belonging to the field of virtual reality technology. The method includes calibrating camera through analyzing image line features; analyzing property of plane support relationship by using categorized lines to obtain a preliminary scene structure; optimizing scene structure via interoperation by a small number of users to complete modeling of scene structure for whole image; and finally registering 3D image scene structure, collected by different cameras through line features, into a unified 3D scene, allowing application into modeling of wide-range scene structure. According to the present invention, corresponding information of 3D scene structure can be rapidly obtained through
(Continued)

interoperation by a small number of users. In the meantime, the present invention can guarantee modeling integrity of scene structure and effectively reducing 3D modeling cost, making 3D reconstruction of wide-range scene structure easier.

5 Claims, 4 Drawing Sheets

(51) Int. Cl.
    *G06T 17/10*     (2006.01)
    *H04N 13/00*     (2018.01)
    *G06T 7/536*     (2017.01)
    *G06T 7/55*     (2017.01)
    *G01B 11/24*     (2006.01)

(52) U.S. Cl.
    CPC ........... *G06T 7/60* (2013.01); *G06T 17/10* (2013.01); *H04N 13/0014* (2013.01); *H04N 13/0239* (2013.01); *G01B 11/24* (2013.01); *G06T 2207/20092* (2013.01)

(58) Field of Classification Search
    CPC ........... G06T 7/536; G06T 7/60; G06T 17/10; G06T 2207/20092
    USPC .......................................................... 348/47
    See application file for complete search history.

(56) References Cited

FOREIGN PATENT DOCUMENTS

| | | |
|---|---|---|
| CN | 102682467 A | 9/2012 |
| CN | 104376596 A | 2/2015 |
| WO | WO 2005/068936 A1 | 7/2005 |

OTHER PUBLICATIONS

Gregory M. Olmschenk, "3DHallway Modeling Using a Single Image" Master's Theses; City College of New York; (May 2013).
Jingjing Qian et al., "A 3D Reconstruction Method Based on Vanishing Points of Single Image" Progress of Computer Technology and Application; (2008); pp. 734-738.
Ren-Ai Shi et al., "3D Reconstruction from a Single Image Based on the Geometric Properties of the Object" Journal of Qingdao University (Natural Science Edition); vol. 26, No. 1; (Feb. 2013).
Jean-Philippe Tardif, "Non-Iterative Approach for Fast and Accurate Vanishing Point Detection" 2009 IEEE 12th International Conference on Computer Version (ICCV); (Sep. 29-Oct. 2, 2009).
The Chinese Examination Report of corresponding Chinese patent application No. 201410715176.5, dated Oct. 17, 2016.
International Search Report of corresponding International PCT Application No. PCT/CN2015/095854, dated Feb. 3, 2016.

\* cited by examiner

METHOD FOR 3D SCENE STRUCTURE MODELING AND CAMERA REGISTRATION FROM SINGLE IMAGE

CROSS-REFERENCE TO RELATED APPLICATIONS

This application is a continuation of International Application No. PCT/CN2015/095854, filed on Nov. 27, 2015, which claims priority to Chinese Patent Application No. 201410715176.5, filed on Nov. 28, 2014, both of which are hereby incorporated by reference in their entireties.

TECHNICAL FIELD

The present invention relates to the technology of modeling of scene structure based on images and the technology of registering of scene structure based on line features, which belongs to the field of virtual reality technology.

BACKGROUND

In recent years, virtual reality technology is being widely applied in the fields of map navigation, smart city, military simulation, etc., and is popular in the modern society since visual effects it created are more consistent with reality. However, these applications are not possible without 3D scene data which is much closer to the real world, thus how to efficiently construct a 3D virtual scene based on the scene of the real world has become one of the hottest issues in computer vision in recent years.

At present, there are many ways to realize 3D scene modeling, for example, by using a professional 3D modeling software, by using binocular imaging technology in computer vision, by using aerial survey technology, etc. For the professional 3D modeling software, such as 3DSMAX and the like, a relative high modeling accuracy can be achieved in the scene modeling process, however, it requires massive manpower and material resource to perform field measurement, resulting in long modeling period and high cost. The modeling technology based on binocular imaging technology, which is generally applied in automatic modeling engineering, has high technological requirements on equipment, and is usually applied to the modeling of small scale scenes, thus the modeling period is relative short, usually lasting for several hours to a few days depending on the complexity of the scene to be modeled, whereas the modeling accuracy thereof is relative low. In comparison, using aerial survey technology can effectively process the scene modeling operation of large scale scenes, and the modeling period is barely constrained by the size of the scenes, but the cost in the earlier and the later stages are both high in that, on one hand, high quality cameras are in demand due to acquisition of data by plane at high altitudes, meanwhile the flight cost is always remaining at a high level; on the other hand, under normal circumstances, the high-altitude photography generally collects a great amount of point cloud data, which requires support of complex algorithm so as to be processed into available model data, the accuracy thereof is merely 10cm. In relative terms, such technology has the worst flexibility due to the fact that it is a great challenge to timely reflect changes in local scene structure to an existing 3D scene considering the limited cost.

Generally speaking, there are some problems in the current modeling method of scene structure in the terms of cost, period, flexibility, accuracy and so on, and hence it is difficult to be effectively applied in the reconstruction of large scale 3D scenes.

SUMMARY

Object of the present invention is to solve problems such as high cost, long cycle and poor flexibility in 3D scene modeling process. And a method for modeling and registering scene structure based on a single image is proposed, which can realize modeling and registration of 3D scene structure in a single image on the basis of analysis and employment of line features in the image together with interoperation by a few users, and can register the 3D scene structure in a unified 3D scene through corresponding relationship between the line features, and extending in such a way to finally obtain a larger-scale 3D scene.

In order to fulfill the purpose of the present invention, a technical solution of a method for modeling and registering 3D scene structure based on a single image is adopted by the invention, including the steps of:

(1) collecting image data with a general camera, extracting the line features in the image, grouping the line features and calculating vanishing points by adopting components expectation maximization (EM) iteration technology, and calibrating the camera with directional features of the vanishing points;

(2) performing plane support properties analysis by using the categorized lines, so as to obtain planes which each pixel in the image belongs to, and segmenting the images according to the planes which the pixels belong to, so as to obtain preliminary information of the scene structure;

(3) extracting and constructing the scene image of the image from the preliminary information of the scene structure via interoperation of users, continuously optimizing the scene image in the course of the interoperation, and generating a final 3D scene structure based on the scene image; and (4) registering the obtained 3D scene structure in the unified 3D scene using characteristic of a single directed line segment, so as to extend the modeling of the 3D scene structure under the perspective of a single camera to a larger scale.

Specifically, collecting the image data with the general camera, extracting the line features in the image, and optimizing the results of the extracted line features with an iterative least square linear fitting method; categorizing the extracted line features via a component EM iterative method, namely conducting each round of the iteration process with a group of lines as a unit, calculating the vanishing points corresponding to each of the groups in the expectation (E) step, combining the groups of lines according to the obtained vanishing points in combination with J-Linkage algorithm, while in the maximization (M) step, regrouping the lines according to the vanishing points obtained after combination of the groups of lines, iterating the above processes until the groups of lines are stable; and finally calculating directions of the vanishing points according to the grouping results in order to complete calibration of the camera.

Specifically, automatically constructing the preliminary information of the scene structure, including analyzing the planes which the pixels belong to according to the plane support properties on the basis of the categorized line features extracted in step (1), so as to obtain the preliminary information of the scene structure; after a point A and two pairs of coplanar parallel lines $\{(l_1,l_2)(l_3,l_4)\}$ are projected on the image plane, if the projection position of the point is within the polygon formed by the projections of the four straight lines and there is no other non-coplanar lines which would block the visibility thereof, then it is considered that a projection point is supported by a corresponding projection plane, namely in space, the point A is positioned in the plane formed by the coplanar parallel lines $\{(l_1,l_2)(l_3,l_4)\}$; and performing plane support properties analysis of all pixels in the image, so as to enable segmentation of the image according to the support properties, and to further obtain the preliminary information of the scene structure.

Specifically, optimizing the preliminary scene structure obtained in step (2) via user interoperation, so as to further obtain a more precise 3D scene structure, wherein the interoperation is realized through defining three types of graphic primitives including point primitive, line primitive and plane primitive, which can be transformed into voxels including point voxel, line voxel and plane voxel respectively corresponding to the primitives through an algorithm, and the voxels obtained in the modeling process are arranged using the scene image; the user's one click action generates one point primitive, which is transformed into one corresponding point voxel in space through the algorithm; the user's one drag-drop action generates one line primitive, which is employed to determine the relationship between two point primitives, namely the spatial position relationships between two point voxels in space; the user's multiple drag-drop actions generate one plane primitive, which is employed to determine the relationships among multiple point primitives via multiple line primitives, namely the spatial position relationships among multiple point voxels in space; and storing the information of the voxels in the scene image, and generating final information of the 3D scene structure from the scene image after the user interoperation is over.

Specifically, registering the 3D scene structure obtained in step (3) in the unified 3D scene using the corresponding relationship of characteristic of a single directed line segment; marking the 3D scene structure obtained in step (3) with N and the unified 3D scene with S, selecting a directed line segment 1 from N and a corresponding line segment L from S, obtaining rotation information of N in S based on the calibration result of the camera in step (1), and obtaining dimension information of N in S according to the length ratio of 1 to L along three coordinate axes, as well as obtaining position information of N in S in accordance with corresponding relationships between vertexes of S and L, and registering N in S based on the information, so as to realize integration of 3D scene structure under perspectives of different cameras.

Comparing with the prior art, the present invention produces the beneficial effects including:

(1) more convenient data collection, which can be accomplished by use of a general camera;

(2) short modeling period and high flexibility, which usually takes 3-10 minutes to accomplish modeling of an image according to complexity of the scene, facilitating rapid 3D scene update;

(3) high expansibility and adaptability to scene of various scales, and capability of extending an existing 3D scene at anytime, enabled by acquiring the image wherever it is needed to be modeled, and registering in the existing unified 3D scene after the modeling;

(4) low modeling cost, resulting from both low data acquisition cost due to acquisition of data by directly using a general camera or access to the existing image data, and the labor cost is brought down by the corresponding modeling tool developed on the aforementioned basis, making it possible for non-specialists to quickly complete the scene structure modeling; and (5) fusion of the 3D scene structure obtained from the modeling with the image data in a real scene in a more ideal manner, with the modeling based on the directly photographed image, thus enhancing the user experience.

DESCRIPTION OF EMBODIMENTS

The present invention is further described with reference to the drawings and embodiments as below.

Figure 1:
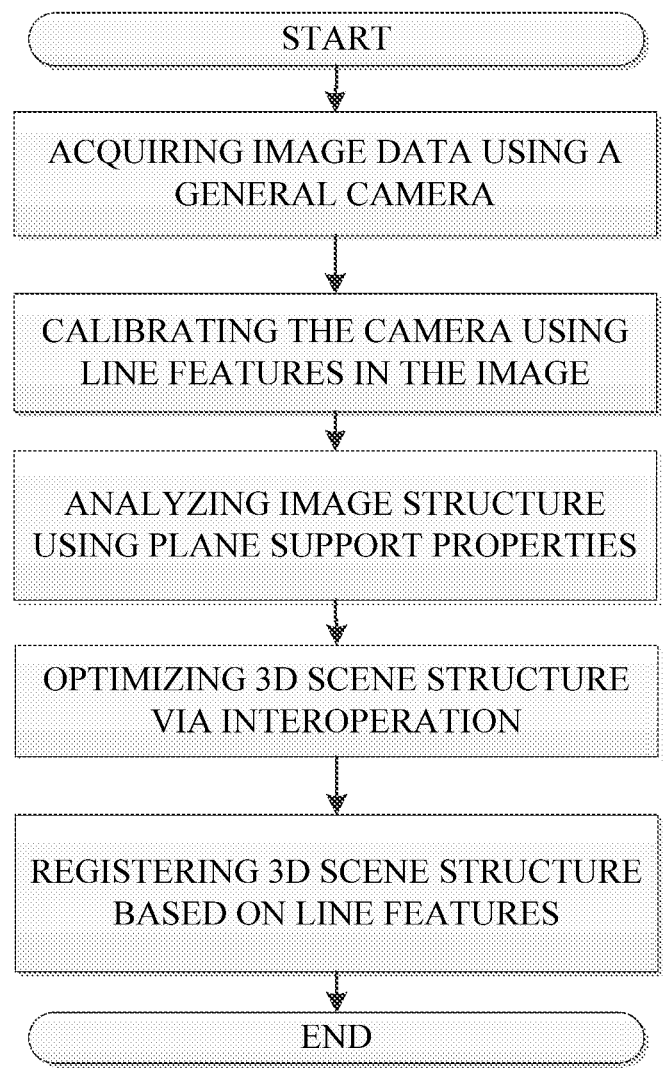
FIG. 1 is a schematic diagram of the technical scheme of the present invention.
Figure 2:
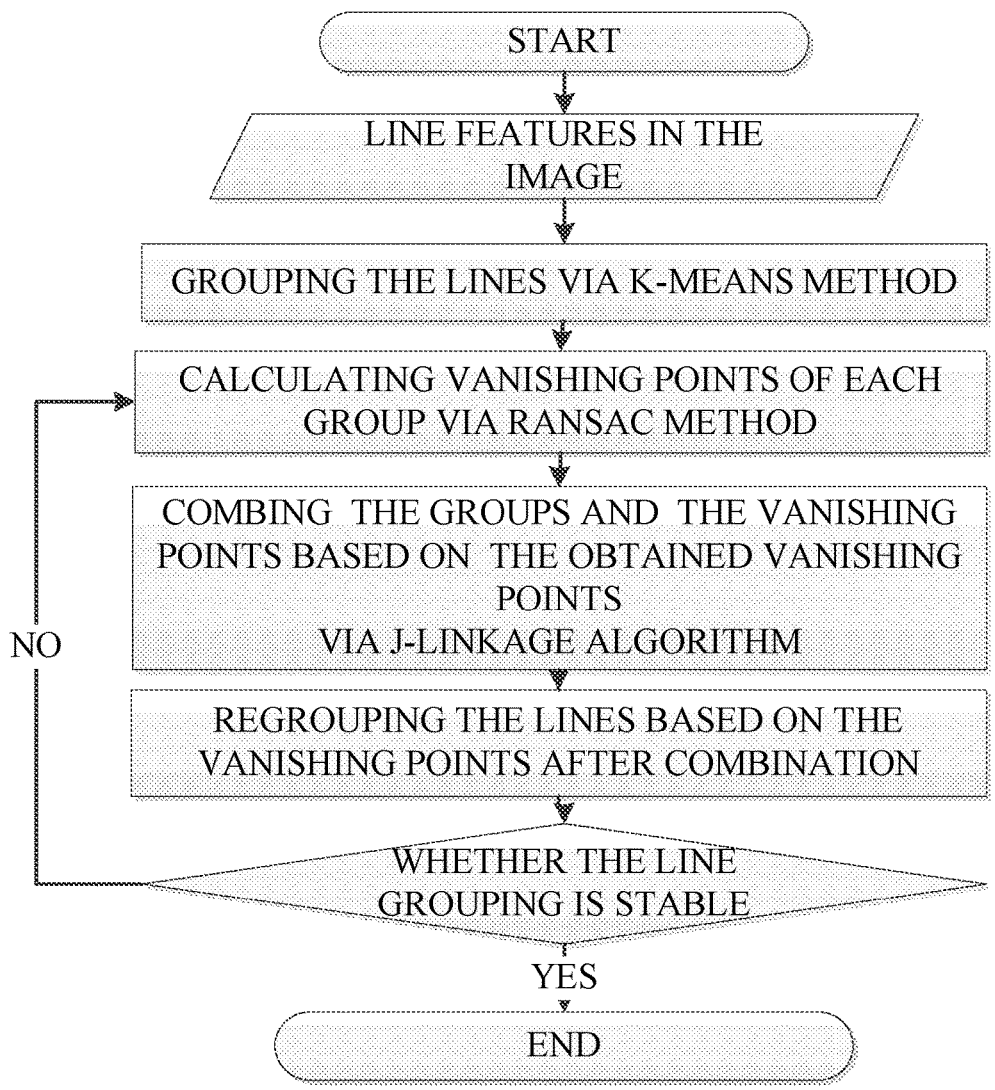
FIG. 2 is flow chart illustrating the process of calculating grouping lines and vanishing points using component EM iterative method.

Step 1: collecting image data with a general camera, extracting line features therein, and labeling the obtained line set as $L=\{l_1,l_2,l_3 \ldots l_n\}$, where n indicates the number of the lines, labeling a current segmentation of the line set L as $L_{segment}=\{LS_1, LS_2, LS_3 \ldots LS_m\}$, where m indicates the number of groups, and according to FIG. 2, the process can be implemented by the following steps.

Firstly, grouping L using K-Means clustering algorithm, the clustering is carried out according to the included angle between the line and the width direction of the image. In regard to $LS_i \in L_{segment}$, the formula for measuring the distance between the clustering center and the line is: $Dist(c_i,l_j)=\min\{abs(c_i-angle(l_j)),180.0-abs(c_i-angle(l_j))\}$.

In the formula above, $c_i$ indicates the clustering center of $LS_i$, $l_j$ indicates the $J_{th}$ line in $LS_i$, $angle(l_j)$ indicates the included angle between $l_j$ and the width direction of the image, and $abs(x)$ indicates the absolute value of x, and after defining the distance formula, the updated formula for defining the clustering center is:

$$c_{new} = \sum_{l_j \in LS_i} (\phi/r),$$

$$\phi = \begin{cases} angle(l_j) & \text{if } abs(angle(l_j) - c_{old}) \leq 90 \\ angle(l_j) - 180 & \text{if } abs(angle(l_j) - c_{old}) > 90 \; angle(l_j) > 90 \\ angle(l_j) + 180 & \text{if } abs(angle(l_j) - c_{old}) > 90 \; angle(l_j) \leq 90 \end{cases}.$$

In the above formula, $c_{new}$ indicates the new clustering center of $LS_i$, $c_{old}$ indicates the previous clustering centers prior to update of $LS_i$, r indicates the number of lines in $LS_i$, and φ is an intermediate variable.

Next, conducting the EM iteration process according to the features of the vanishing point in order to optimize the existing grouping lines, including the following steps:

(1) sampling each grouping lines via RANSAC method, so as to obtain the information of the vanishing point of the grouping lines;

(2) combing the grouping lines belonging to the same vanishing point by applying J-Linkage algorithm to each grouping line;

(3) calculating directions of a new vanishing point according to the combined grouping lines, and regrouping L; and (4) determining whether the new grouping is identical with the original grouping, if yes, terminating the process, otherwise repeating step (1).

Figure 3:
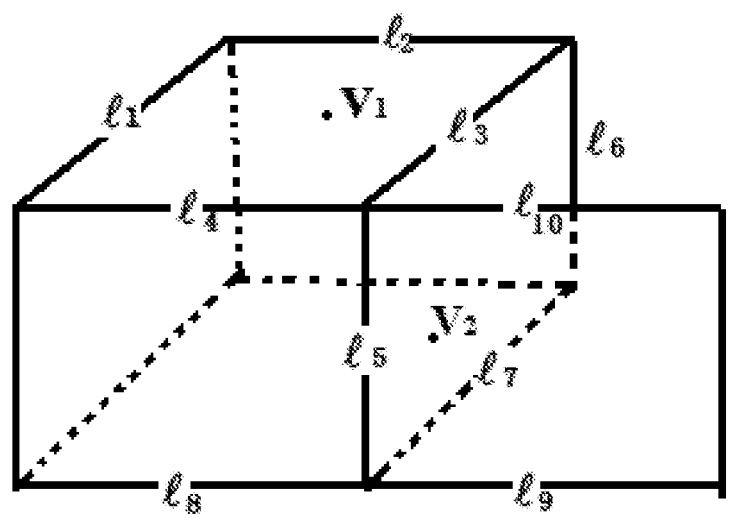
FIG. 3 is a schematic diagram of plane support properties analysis of the present invention.

Step 2: the main purpose is to perform preliminary analysis of the scene structure in order to obtain plane segmentation of the image, which is achieved mainly by using plane support properties. After a point and two pairs of coplanar parallel lines are projected on the image plane, if the projection position of the point is within the polygon formed by the projections of the four straight lines and there is no other non-coplanar lines which would block the visibility thereof, then it is considered that a projection point is supported by the plane formed by projection lines, namely in space, the point also belongs to the plane which the four straight lines belong to. Take the point $v_1$ and the lines $l_1$, $l_2$, $l_3$ and $l_4$ in FIG. 3 as an example, wherein $v_1$ lies within the polygon formed by the lines $l_1$, $l_2$, $l_3$ and $l_4$, and there is no other non-coplanar lines within the polygon which would block the visibility of $l_1$, $l_2$, $l_3$ and $l_4$ so that $l_1$, $l_2$, $l_3$ and $l_4$ are visible to $v_1$, thus $v_1$ is considered to be supported by the plane formed by $l_1$, $l_2$, $l_3$ and $l_4$; assuming that $l_1$, $l_3$ and $l_2$, $l_4$ respectively correspond to the coplanar parallel lines $L_1$, $L_3$ and $L_2$, $L_4$ in space, therefore it can be reasonably deduced that the spatial position $V_1$ corresponding to the point $v_1$ is in the plane formed by $L_1$, $L_2$, $L_3$ and $L_4$, whereas in the case of point $v_2$, though $v_2$ is located within the polygon formed by $l_3$, $l_5$, $l_7$ and $l_6$, the corresponding spatial point thereof can't be determined as belonging to the plane formed by $L_3$, $L_5$, L, and $L_6$ due to lack of support caused by line $l_{10}$ which, not in the same plane with $l_3$, $l_5$, $l_7$ and $l_6$, renders line $l_6$ invisible to $v_2$.

Figure 4:
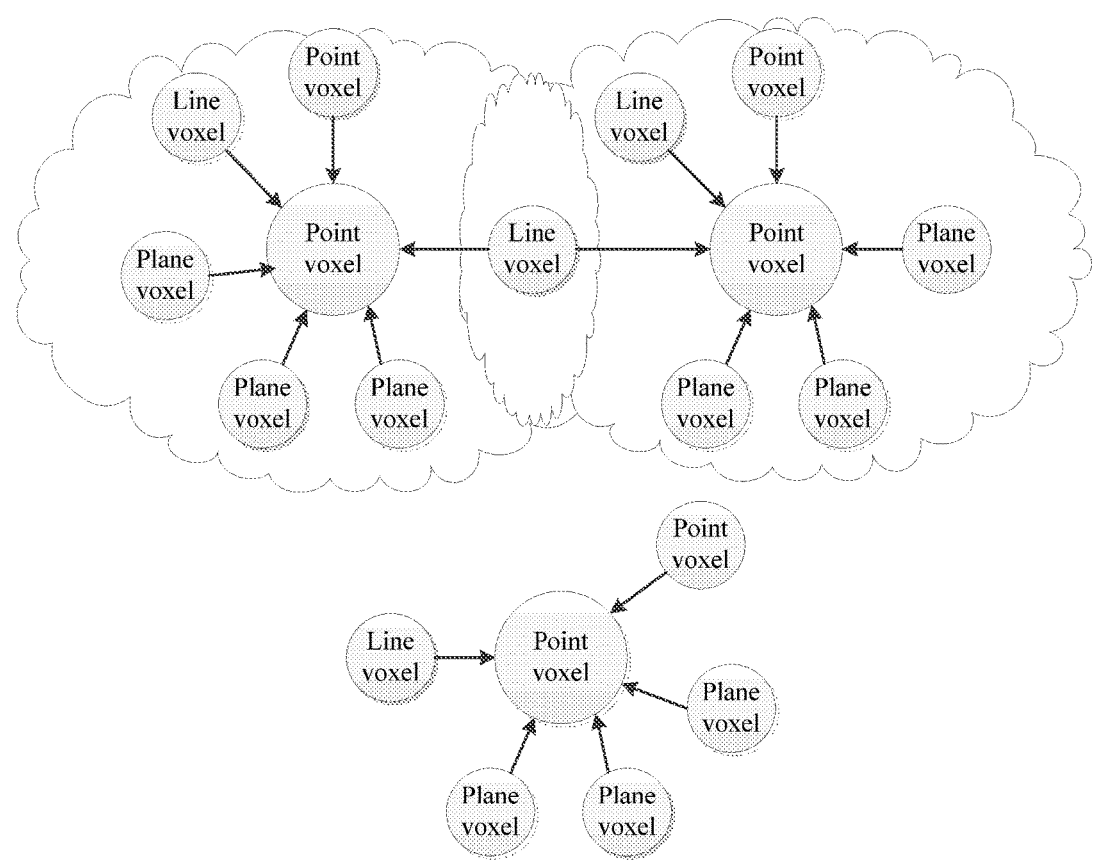
FIG. 4 is a schematic diagram of the scene image constructed through interoperation of the present invention.

Step 3 is mainly carried out on the basis of the preliminary scene structure obtained in Step 2, defining three types of graphic primitives including point primitive, line primitive and plane primitive, and generating voxels including point voxel, line voxel and plane voxel respectively corresponding to the primitives through an algorithm The relationships among the primitives on the image plane are obtained based on user interoperation, and are transformed along with the corresponding primitives into the voxels and the corresponding relationships among the voxels in space via an algorithm. In order to effectively arrange the voxels, the intermediate results obtained from the user interoperation are stored in the scene image as shown in FIG. 4, wherein the scene image has the following features:

(1) the scene image uses the voxels as the vertexes, and uses coordinates of the local world that the voxels belong to as the edges;

(2) the scene image is divided into several pieces, among which there can be a common line voxel indicating the relationships among the pieces;

(3) each piece has a point voxel as the center which is employed to form a local world coordinate system; and (4) determining whether a new voxel to be added is located in a certain local world coordinate system, if it is, adding the new voxel to the image while adding a directed edge at the same time to direct towards the point voxel corresponding to the coordinate system; otherwise selecting a point voxel from the voxels and adding into the image, so as to form a local world coordinate system, then adding the voxel into the image while adding a directed edge at the same time to direct towards the point voxel.

After the interoperation is completed, combining the voxels according to the relationships among the voxels in the scene image to generate the final 3D scene structure.

Step 4: the main purpose is to register the 3D scene structure obtained from the modeling of a single image into a unified 3D scene, which is realized through the line features. Specially, drawing a directed line segment in the 3D scene obtained from modeling, and drawing a corresponding line segment in the unified 3D scene; and accordingly, obtaining the rotation information of the modeled 3D scene in the unified 3D scene based on the camera calibration results in Step 1 and the direction information of the directed line segment, obtaining the dimension information of the modeled 3D scene in the unified 3D scene according to the length ratio of the two line segments, so as to obtain the position information of the modeled scene in the unified 3D scene through the corresponding relationships between the endpoints of the line segments, thereby further obtaining all the position information of the modeled scene in the unified 3D scene.

The part of the present invention that is not elaborated herein belongs to the prior art as far as those skilled in the art are concerned.

The description above only includes the preferred embodiments of the present invention. And it should be pointed out that, for those skilled in the art, some modifications and polishing can be made without departing from the principle of the invention, and the same modifications and polishing should be regarded to be within the scope of the invention.

What is claimed is:

1. A method for modeling and registering 3D scene structure based on a single image, comprising: collecting image data with a general camera; calibrating the camera with line features in the collected image, and performing plane-support characteristic analysis on the basis thereof, so as to preliminarily obtain information of scene structure in the image; then forming a scene image via user interoperation, and generating a final 3D scene structure from the scene image; and finally registering the obtained 3D scene structure in a unified 3D scene by using characteristic of a directed line segment, completing reconstruction of wide-range 3D scene structure under perspectives of multiple cameras, characterized by steps of:

(1) collecting the image data with the general camera, extracting the line features in the image, grouping the line features and calculating vanishing points by adopting components expectation maximization iteration technology, and calibrating the camera with directional features of the vanishing points;

(2) performing plane support characteristic analysis by using the categorized lines, so as to obtain planes to which each pixel in the image belongs, and segmenting the image according to the planes to which the pixels belong, in order to obtain preliminary information of the scene structure;

(3) extracting and constructing a scene image of the image from the preliminary information of the scene structure via user interoperation, continuously optimizing the scene image in the course of the interoperation, and generating a final 3D scene structure based on the scene image; and (4) registering the obtained 3D scene structure into the unified 3D scene by using characteristic of a single directed line segment, so as to extend modeling of the 3D scene structure under the perspective of a single camera to a larger scale.

2. The method for modeling and registering 3D scene structure based on a single image according to claim 1, wherein in step (1), collecting the image data with the general camera, extracting the line features in the image, and optimizing the results of the extracted line features with an iterative least square linear fitting method; categorizing the extracted line features via a component expectation maximization (EM) iterative method, namely conducting each round of the iteration process with a group of lines as a unit, calculating the vanishing points corresponding to each of the groups in the expectation (E) step, combining the groups of lines according to the obtained vanishing points in combination with J-Linkage algorithm, while in the maximization (M) step, regrouping the lines according to the vanishing points obtained after combination of the groups of lines, and iterating the above processes until the groups of lines are stable; and finally calculating directions of the vanishing points according to the grouping results, in order to complete calibration of the camera.

3. The method for modeling and registering 3D scene structure based on a single image according to claim 1, wherein in step (2), analyzing the planes which the pixels belong to according to the plane support properties on the basis of the categorized line features extracted in step (1), so as to obtain the preliminary information of the scene structure; after a point A and two pairs of coplanar parallel lines $\{(l_1, l_2)(l_3,l_4)\}$ are projected on the image plane, if the projection position of the point is within the polygon formed by the projections of the four straight lines and there is no other non-coplanar lines which would block the visibility thereof, then it is considered that a projection point is supported by a corresponding projection plane, namely in space, the point A is positioned in the plane formed by the coplanar parallel lines $\{(l_1, l_2) (l_3, l_4)\}$; and performing plane support properties analysis of all pixels in the image, so as to enable segmentation of the image according to the support properties, and to further obtain the preliminary information of the scene structure.

4. The method for modeling and registering 3D scene structure based on a single image according to claim 1, wherein in step (3), optimizing the preliminary scene structure obtained in step (2) through user interoperation, so as to obtain a more precise 3D scene structure; wherein the interoperation is realized through defining three types of graphic primitives comprising point primitive, line primitive and plane primitive, which can be transformed into voxels comprising point voxel, line voxel and plane voxel respectively corresponding to the primitives through an algorithm, and the voxels obtained in the modeling process are arranged using the scene image; the user's one click action generates one point primitive, which is transformed into one corresponding point voxel in space through the algorithm; the user's one drag-drop action generates one line primitive, which is employed to determine the relationship between the two point primitives, namely the spatial position relationships between two point voxels in space; the user's multiple drag-drop actions generate one plane primitive, which is employed to determine the relationships among multiple point primitives via multiple line primitives, namely the spatial position relationships among multiple point voxels in space; and storing information of the voxels in the scene image, and generating final information of the 3D scene structure from the scene image after the user interoperation is over.

5. The method for modeling and registering 3D scene structure based on a single image according to claim 1, wherein in step (4), registering the 3D scene structure obtained in step (3) in the unified 3D scene using characteristic of a single directed line segment; marking the 3D scene structure obtained in step (3) with N and the unified 3D scene with S, selecting a directed line segment 1 from N and a corresponding line segment L from S, obtaining rotation information of N in S based on the calibration result of the camera in step (1), and obtaining dimension information of N in S according to the length ratio of 1 to L along three coordinate axes, as well as obtaining position information of N in S in accordance with corresponding relationships between vertexes of S and L, and registering N in S based on the above information, so as to realize integration of the 3D scene structure under perspectives of different cameras.

* * * * *